United States Patent [19]

Mirtain

[11] 4,173,991
[45] Nov. 13, 1979

[54] PNEUMATIC TIRE WITH ASYMMETRIC REINFORCING BELT

[75] Inventor: Henri J. Mirtain, Compiegne, France

[73] Assignee: Uniroyal, Inc., New York, N.Y.

[21] Appl. No.: 891,671

[22] Filed: Mar. 30, 1978

[30] Foreign Application Priority Data

Apr. 6, 1977 [FR] France ............................... 77 10428

[51] Int. Cl.² .............................................. B60C 9/18
[52] U.S. Cl. ........................ 152/361 FP; 152/209 D
[58] Field of Search ............... 152/361, 354 R, 357 R, 152/209 R, 209 A; D12/136, 140-151

[56] References Cited

U.S. PATENT DOCUMENTS

| | | | |
|---|---|---|---|
| T943,005 | 2/1976 | Smithkey, Jr. | 156/123 |
| 3,217,776 | 11/1965 | Ellenrieder et al. | 152/209 A |
| 3,231,000 | 1/1966 | Massoubre | 152/361 |
| 3,405,753 | 10/1968 | Verdier | 152/209 |
| 3,473,594 | 10/1969 | Mirtain | 152/361 FP |
| 3,623,529 | 11/1971 | Fausti | 152/361 FP |
| 3,850,219 | 11/1974 | Snyder | 152/361 DM |
| 3,863,695 | 2/1975 | Mirtain | 152/361 FP |
| 3,949,799 | 4/1976 | Montagne | 152/361 FP |

FOREIGN PATENT DOCUMENTS

| | | | |
|---|---|---|---|
| 1680458 | 4/1971 | Fed. Rep. of Germany | 152/361 FP |
| 2622904 | 12/1976 | Fed. Rep. of Germany | 152/361 FP |
| 1435170 | 3/1966 | France | 152/361 FP |
| 2176955 | 11/1973 | France | 152/361 FP |
| 2286719 | 3/1977 | France | 152/361 FP |
| 1130887 | 10/1968 | United Kingdom | 152/361 R |
| 1144556 | 3/1969 | United Kingdom | 152/361 FP |

*Primary Examiner*—Joseph F. Peters, Jr.
*Assistant Examiner*—D. W. Underwood
*Attorney, Agent, or Firm*—Philip Rodman

[57] ABSTRACT

The pneumatic tire has a reinforcing belt that is asymmetric with respect to the equatorial plane of the tire. The reinforcing belt includes a ply folded to form confronting main and auxiliary portions, with the fold being situated at an axially internal edge of the tire. Other embodiments of the reinforcing belt include a supplementary ply preferably positioned adjacent the auxiliary ply.

Further embodiments of the tire include a tread having sculpture characteristics that differ from the axially internal side of the equatorial plane to the axially external side thereof, with provision for the reinforcement belt to be of lesser diameter at an axially external edge of the tire than at an axially internal edge thereof.

23 Claims, 9 Drawing Figures

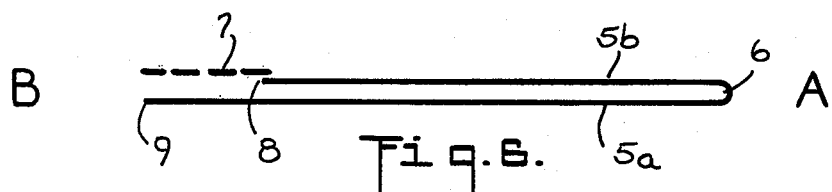
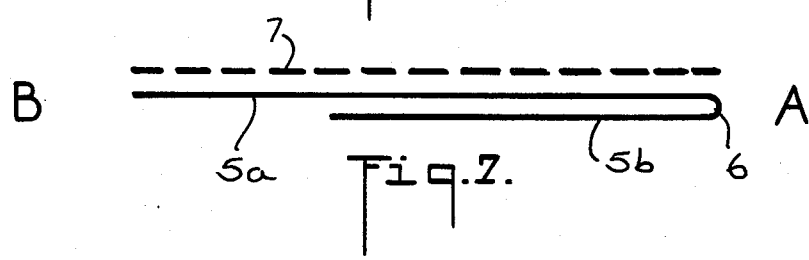
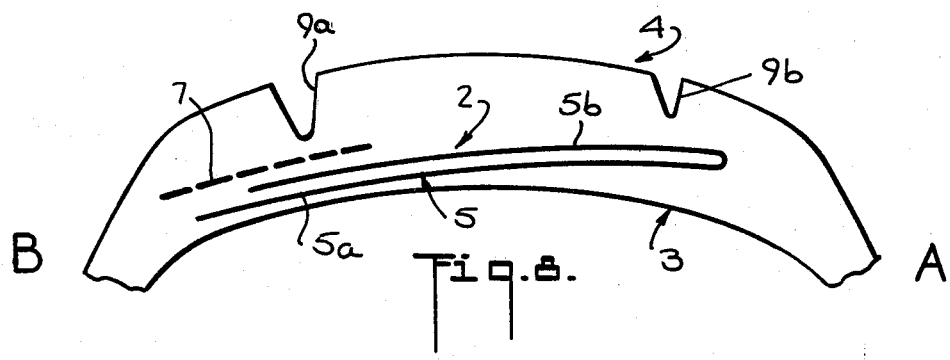
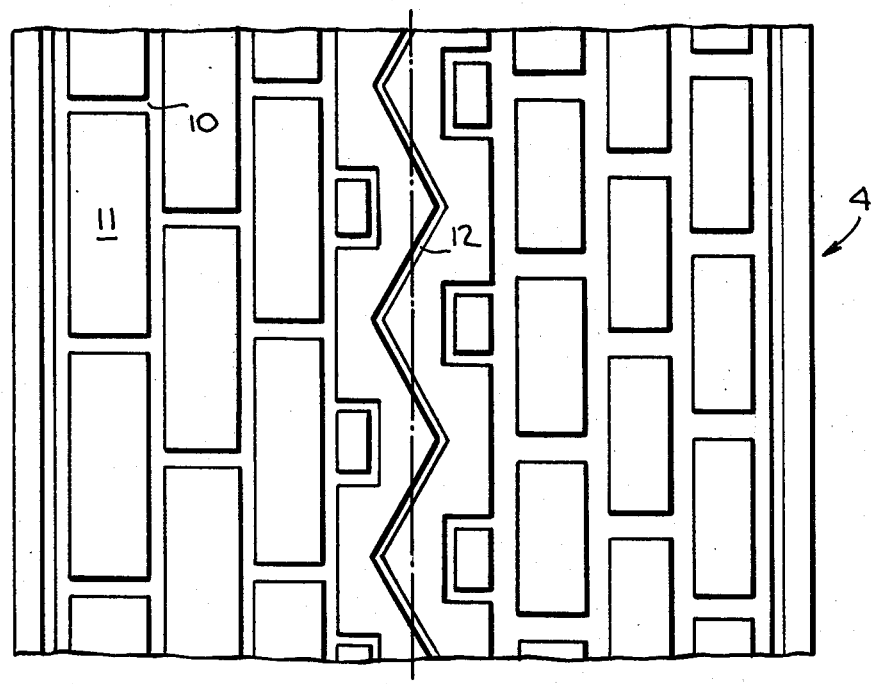

PNEUMATIC TIRE WITH ASYMMETRIC REINFORCING BELT

This invention relates to pneumatic tires and more particularly to a pneumatic tire having an asymmetric reinforcement belt.

It is well known to provide a pneumatic tire, especially those which include a radial carcass, with a reinforcement belt between the carcass and the tread. The reinforcement belt helps increase the transverse rigidity of the tire and can comprise one or more plies, folded or unfolded at a lateral edge, and formed of a layer of rubber reinforced by filiform elements made of steel, fiberglass, artificial and natural textiles, or other similar materials. The term "filiform element" as used herein refers to strands, twisted cords or yarns, and the like.

A well known problem recognized by the tire industry is the resistance of the tire to roll along the ground in its inflated condition. Rolling resistance is usually accompanied by heat build-up in the tread and the sidewalls, as well as accelerated wear of the tread in relation to the amount of roll resistance. Rolling resistance coupled with heavy load and/or high speeds can also lead to tearing and separation of the tire plies, especially at the side edges of the plies.

Proposed solutions to the problems of resistance to roll, ply separations, and ply tears are usually complex or costly and often reduce the skid resistance of the tire as well. The term "skidding" as used herein refers to forces that tend to cause an asymmetric deformation and/or wear in the crosswise direction of the tire when the vehicle to which the tire is mounted proceeds around a curve.

A reduction in tire rolling resistance will reduce tire wear and correspondingly save energy, improve the speed capability of the tire and reduce ply separations and/or tears, thereby prolonging the life of the tire. An increased resistance by the tire to skidding forces provides improved lateral road-holding ability that permits greater driving precision and control so that higher speeds are obtainable at a higher degree of driving safety. Improved skid resistance in a tire also reduces tire wear and thereby increases the life of the tire. It is thus desirable to provide a reinforcement belt for a pneumatic tire that provides reduced roll resistance without reducing the skid resistance of the tire.

Among the several objects of the present invention may be noted the provision of a novel reinforcement for a pneumatic tire, a novel pneumatic tire with an asymmetric reinforcing belt, and a novel pneumatic tire with an asymmetric reinforcing belt including a tread having sculpture characteristics that differ from one side of the equatorial plane to an opposite side thereof.

Other objects and features will be in part apparent and in part pointed out hereinafter.

The present invention relates to a pneumatic tire wherein an annular reinforcement belt surrounds a carcass intermediate the carcass and the tread in substantially asymmetrical relationship to an equatorial plane of the tire.

The reinforcement belt, in cross-section, comprises at least one ply of filiform elements having a relatively high modulus of elasticity, coated with a natural or synthetic elastomer. The ply is folded into two parts to form a main portion and an auxiliary portion, with the fold being preferably situated at the axially internal side of the tire. The phrase "axially internal" as used herein refers to the side of the tire facing the median longitudinal vertical plane of the vehicle whereas the phrase "radially interior" is to be taken with reference to the axis of revolution of the wheel. The phrases "axially external" and "radially exterior", as used herein, refer to elements situated opposite those referred to by the phrases "axially internal" and "radially interior".

It has been found through non-destructive laser holography examination that belt separations in a tire occur most frequently along the axially internal side. In accordance with the present invention the folded portion of the reinforcement belt is preferably situated along the axially internal side of the tire rather than along the axially external side. Under this arrangement the skid forces can be counteracted and ply separations reduced both along the axially internal side and along the axially external side of the tire. It should be noted that when two superpositioned flat plies of identical widths are used in lieu of the two superpositioned flat plies of unequal widths the resulting effect is an increase in the resistance of the tire to the forces of lateral skid. However such arrangement does not reduce the incidence of ply separations or tearings. For example, in a test run under severe conditions the tire service life for plies of identical width was 90 hours compared with 200 hours service life when plies of unequal width are used. It is thus a further objective of the invention to reduce the incidence of ply separations and/or tears while at the same time increasing the skid resistance of the tire.

The auxiliary portion of the reinforcement belt can be radially internal of the main portion with respect to the tire axis, or radially external of the main portion and is of lesser width than the main portion.

In one embodiment of the invention the folded ply constitutes the entire structure of the reinforcement belt. In other embodiments of the invention the reinforcement belt includes at least one supplementary ply of filiform elements having a relatively low modulus of elasticity, coated with a natural or synthetic elastomer. The supplementary ply is preferably situated in closer proximity to the auxiliary portion of the folded ply than the main portion, and extends at least from the free lateral edge of the main portion to the free lateral edge of the auxiliary portion, preferably overlapping the free edge of the auxiliary portion. This arrangement of the supplementary ply helps prevent separations or tears that might occur in the vicinity of the free lateral edges of the main and auxiliary portions of the folded ply.

The invention also contemplates embodiments wherein the lateral edge of the supplementary ply extends beyond the free lateral edge of the main portion.

It has been found that tires having reinforcement belts made in accordance with the present invention exhibit lesser wear along the axially internal side of the tread than along the axially external side. Therefore to compensate for this uneven tread wear a larger quantity of elastomer material is provided along the axially external side than along the axially internal side such as for example by furnishing wider ribs and narrower grooves along the axially external side of the tire. If a block pattern is provided in the tread, the blocks can be more numerous or more extended along the axially external side than along the axially internal side with a corresponding reduction in width of any hollow spaces between the blocks. Thus, in accordance with the present invention the ratio of solid to hollow area in the tread is greater along the axially external side than along the axially internal portion. The ratio of solid to hollow area in the tread can be arranged to diminish continuously and/or discontinuously as one goes from the axially external side edge to the axially internal side edge of the tread.

To accomplish the desired variation in the ratio of solid to hollow area in the tread, one may employ sculpture patterns that readily lend themselves to such variations along the transverse area of the tread, such as, for example, the tread patterns shown in the French Pat. No. 2,227,965.

The invention accordingly comprises the constructions hereinafter described, the scope of the invention being indicated in the following claims.

In the accompanying drawings in which several embodiments of the invention are illustrated:

FIGS. 3-7 are schematic representations of reinforcement belt constructions incorporating further embodiments of the present invention, the belt construction being disassociated from the tire environment for purposes of clarity;

FIG. 8 shows still another embodiment of the present invention; and,

FIG. 9 is a top plan view of the tread region of a further embodiment of the invention.

Figure 1:
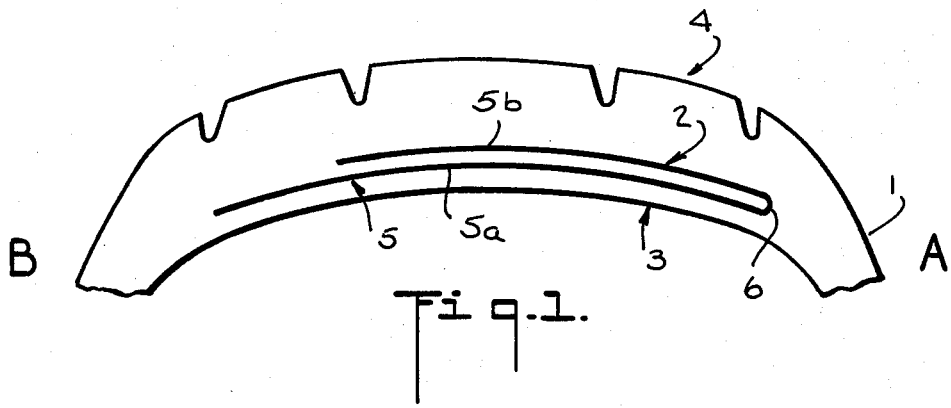
FIG. 1 is a fragmentary sectional view of a pneumatic tire incorporating one embodiment of the present invention.

Referring now to the drawings, the pneumatic tire is generally indicated by reference number 1. The pneumatic tire 1 includes a reinforcement belt 2 disposed between a carcass 3 and a tread 4. In FIGS. 1-8 of the drawings the letter "A" designates the axially internal side of the tire 1 or the belt 2 and the letter "B" designates the axially external side thereof.

It should be noted that structural details of the tire 1 not shown or described can be those of any suitable known construction. Moreover, the specific carcass 3 and the tread structure 4 can be of any suitable known type except where otherwise indicated.

Referring particularly to FIG. 1 the reinforcement belt 2 comprises a ply 5 folded at 6 to form a main portion 5a and an auxiliary portion 5b of lesser width than the main portion 5a. Preferably the width of the auxiliary portion 5b is approximately 65% to 90% of the width of the main portion 5a.

The ply 5 is made of filiform elements coated with a natural or synthetic elastomer. The filiform elements can be made of steel or of an aromatic polyamide ("Aramide") having a high modulus of elasticity, preferably in excess of 3500 kilograms per sq. mm. or 260 gm. per denier, such as the material known by the trademark "Kevlar". The orientation of the filiform elements with respect to the equatorial plane is within an angular range of 12° to 45°, preferably between 20° and 30°.

Figure 2:
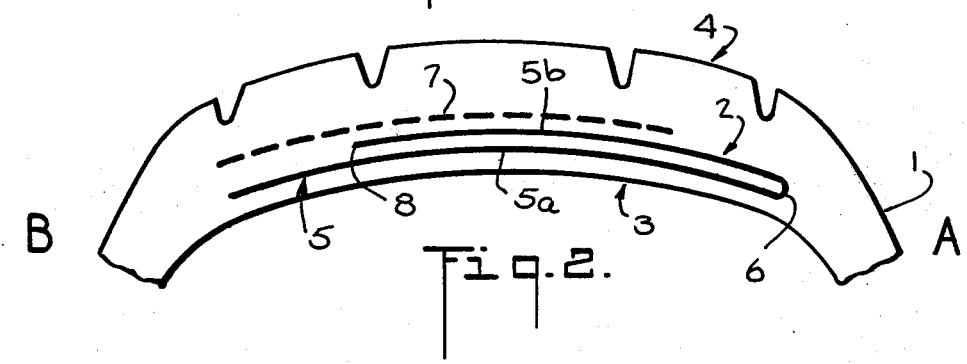
FIG. 2 shows another embodiment thereof.

Referring now to FIG. 2, the reinforcement belt 2 includes the ply 5 of FIG. 1 plus a supplementary ply 7. Preferably the width of the supplementary ply 7 is approximately 10% to 110% of the width of the main portion 5a.

The supplementary ply 7 is formed of filiform elements of elastic material having a modulus of elasticity of less than 2000 kilograms per sq. mm., preferably less than 1000 kilograms per sq. mm., as for example an aliphatic polyamide such as nylon, polyester or cellulose acetate. The filiform elements of the supplementary ply 7 are longitudinally arranged either parallel to the equatorial plane of the tire or at a slight angle of less than 15° with respect to the equatorial plane.

The auxiliary portion 5b of the folded ply 5 has a free lateral edge 8. In the FIG. 2 embodiment the supplementary ply 7 extends at least 70% of the width of the main portion 5a overlapping the free lateral edge 8 of the auxiliary portion 5b. Preferably the supplementary ply 7 overlaps the auxiliary portion 5b an amount that is approximately 10% to 30% of the width of the main portion 5a.

Figure 3:
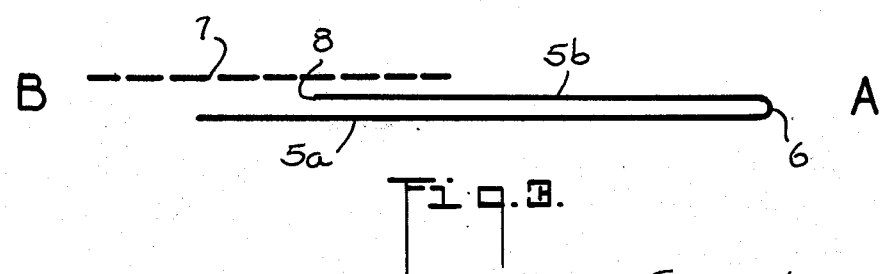
Figure 4:
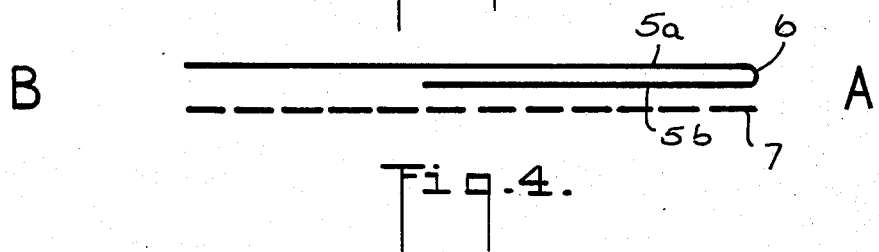
Figure 5:
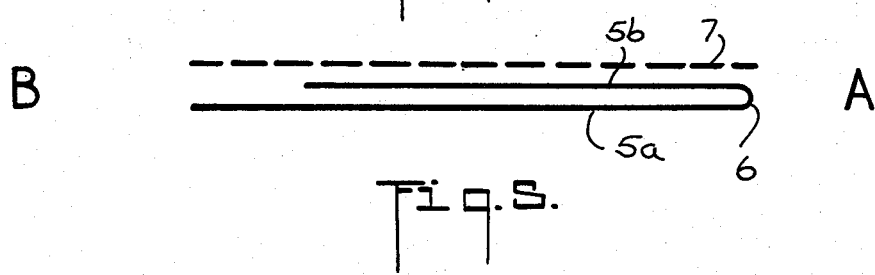

In FIGS. 3-6, the rotational axis of the tire, although not shown, is below the reinforcement belt. In FIGS. 3, 5 and 6 the auxiliary portion 5b is radially exterior to the main portion 5a with respect to the rotational axis of the tire. In FIG. 4 the auxiliary portion 5b is radially interior to the main portion 5a and the supplementary ply 7 is radially interior to the auxiliary portion 5b with respect to the rotational axis of the tire.

The embodiment of FIG. 3 includes a ply 5 that is identical to the ply 5 in the FIG. 2 embodiment. However, the supplementary ply 7 overlaps both the free lateral edge 8 of the auxiliary portion 5b and the free lateral edge 9 of the main portion 5a. The FIG. 3 reinforcing belt arrangement has been found to perform as well as the belt arrangement of FIG. 2 and is preferable because of the lesser amount of material required for the supplementary ply 7. For example, the optimum relative width of the auxiliary portion 5b is approximately 80% of the width of the main portion 5a, and the optimum relative width of the supplementary ply 7 is approximately 50% of the width of the main portion 5a. An amount of the supplementary ply 7 equal to approximately 20% of the width of the main portion 5a overlaps the auxiliary portion 5b.

In the embodiment of FIG. 4 the auxiliary portion 5b is radially interior to the main portion 5a and the supplementary ply 7 is radially interior to the auxiliary portion 5b. The supplementary ply 7 has a lateral width approximately equal to that of the main portion 5a.

The embodiment of FIG. 5 differs from the FIG. 2 embodiment by the extension of the supplementary ply 7 over the entire width of the main portion 5a.

In the embodiment of FIG. 6 the supplementary ply 7 extends substantially from a free lateral edge 9 of the main portion 5a up to the free lateral edge 8 of the auxiliary portion 5b.

The embodiment of FIG. 7 differs from the FIG. 4 embodiment by provision of the supplementary ply 7 radially external to the main ply portion 5a instead of radially internal to the auxiliary portion 5b.

In the embodiment of FIG. 9 the tread 4 includes grooves 10 that separate circumferential rows of rectangular blocks 11 that all have the same depth. However, the size of the blocks 11 is increasingly greater and the ratio of solid to hollow area is increasingly greater from the axially internal side "A" of the tread to the axially external side "B". Moreover the grooves 10 are narrower along the axially external side "B" than along the axially internal side "A". A supplementary groove 12 is provided at the median portion of the tread and essentially divides the axially external region "B" from the axially internal region "A".

Another solution to the problem of asymmetric tread wear is to provide the tread pattern with a greater depth of sculptures along the axially external side "B" than along the axially internal side "A".

As seen in FIG. 8 the rubber thickness between the reinforced carcass 3 and the reinforcement belt 2 is greater along the axially internal side "A" than along the axially external side "B" of the tire. This result can be obtained by superpositioning rubber plies between the carcass 3 and the belt 2 that have a width that decreases toward the axially external side "B". In the region that is radially beyond the belt 2, the rubber thickness is greater along the axially external side "B", which is provided with a deeper tread pattern, than along the axially internal side "A" as schematically represented by a groove 9a at the axially external side "B" that is ddeper than a groove 9b at the axially internal side "A".

The tread pattern, despite a difference in tread depth between the axially external side "B" and the axially internal side "A" of the tread, is substantially symmetrical with respect to the equatorial plane of the tire. Also the diameter of the reinforcing belt along the axially external side "B" of the tire is reduced. Under this arrangement the rate of tread wear is greater along the axially external side "B" but the tire furnishes identical skid resistance properties over its entire tread width due to the greater thickness of the rubber that is radially beyond the belt 2 along the axially external side "B". The reduced diameter of the reinforcement belt 2 at the axially external side "B" of the tire has the effect of further improving the overall performance of the tire.

It is within the concept of the present invention to reverse the radial order of the plies in the reinforcement belt. In addition, in FIGS. 2 and 4–6 the supplementary ply 7 can project beyond the free edge 9 of the main portion 5a.

Some advantages of the present invention evident from the foregoing description include a tire construction wherein the structure and arrangement of the reinforcing belt furnishes a reduction in overall roll resistance of the tire, a reduction in belt separations and tearing thereof, and an increased resistance to skid forces. Further consequential advantages are improved road-holding ability permitting attainment of higher speeds and, an increased service life due to a reduced rate of tread wear.

The reinforcement belts of FIGS. 1–7, and, to a greater extent, those of FIGS. 2–5 exhibit all of the desired characteristics of high resistance to the forces of lateral skidding, high resistance to belt separation and ply tears, slight resistance to roll, low tread wear, increased speed capability, accurate road-holding ability, long service life, improved safety and comfort, and lower travel cost per mile.

As various changes could be made in the above constructions without departing from the scope of the invention, it is intended that all matter contained in the above description and shown in the accompanying drawings shall be interpreted as illustrative and not in a limiting sense.

In view of the above, it will be seen that the several objects of the invention are achieved and other advantageous results attained.

What is claimed is:

1. A pneumatic tire having a tread and a carcass with a reinforcement belt incorporated between said tread and carcass, said reinforcement belt comprising, in cross-section, a ply of filiform elements coated with an elastomer, said ply being folded into two confronting parts of unequal lateral extent between an axially internal edge of the tread and an axially external edge of the tread, said axially internal edge facing the interior of a vehicle when the tire is mounted to the vehicle and said axially external edge facing away from said vehicle, no part of said reinforcement belt being disposed between the confronting parts of said folded ply, said fold being situated at the axially internal edge, said confronting parts including a main portion having the maximum width of said belt and having a first free lateral edge near the axially external edge of said tire, and an auxiliary portion of lesser width than said main portion, and having a second free lateral edge between said fold and the first free lateral edge of said main portion and wherein the distance between said reinforcing belt and said carcass increases in a lateral direction from the axially external edge of the tire to the axially internal edge and the diameter of said reinforcement belt is smaller at the axially external edge than at the axially internal edge, said tread including sculptures, said sculptures being deeper at the tread portion nearer the axially external edge than at the tread portion nearer the axially internal edge.

2. A pneumatic tire as claimed in claim 1 wherein said auxiliary portion is disposed radially exterior to said main portion with respect to the rotational axis of said tire.

3. A pneumatic tire as claimed in claim 1 wherein said auxiliary portion is disposed radially interior to said main portion with respect to the rotational axis of said tire.

4. A pneumatic tire as claimed in claim 1 wherein the filiform elements of said folded ply are formed of steel.

5. A pneumatic tire as claimed in claim 1 wherein the filiform elements of said folded ply are formed of aromatic polyamide, having a modulus of elasticity in excess of 3500 kilograms per sq. mm. or 260 grams per denier.

6. A pneumatic tire as claimed in claim 5 wherein said folded ply is formed of material known under the tradename "Kevlar".

7. A pneumatic tire as claimed in claim 1 wherein the reinforcement belt further includes a supplementary ply of filiform elements coated with an elastomer and extending between the free lateral edge of the auxiliary portion and the free lateral edge of the main portion.

8. A pneumatic tire as claimed in claim 7 wherein the supplementary ply overlaps the free lateral edge of the auxiliary portion extends toward said fold.

9. A pneumatic tire as claimed in claim 8 wherein the amount of overlap is equal to approximately 10% to 30% of the width of said main portion.

10. A pneumatic tire as claimed in claim 7 wherein the supplementary ply overlaps and extends beyond the free lateral edge of the main portion.

11. A pneumatic tire as claimed in claim 7 wherein the width of said auxiliary portion is approximately 80% of the width of the main portion and the width of the supplementary ply is approximately 50% of the width of said main portion, said supplementary ply overlapping said auxiliary portion by an amount equal to approximately 20% of the width of said main portion.

12. A pneumatic tire as claimed in claim 8 wherein the supplementary ply is disposed adjacent to said auxiliary portion.

13. A pneumatic tire as claimed in claim 10 wherein the supplementary ply is disposed adjacent to said auxiliary portion.

14. A pneumatic tire as claimed in claim 4 further including a supplementary ply of filiform elements coated with an elastomer and extending between the free lateral edge of the auxiliary portion and the free lateral edge of the main portion, said filiform elements being formed of elastic non-metallic material, having a modulus of elasticity below 2000 kilograms per sq. mm., said filiform elements being oriented at an angle between 0° and 15° with the equatorial plane of the tire.

15. A pneumatic tire as claimed in claim 5 further including a supplementary ply of filiform elements coated with an elastomer and extending between the free lateral edge of the auxiliary portion and the free lateral edge of the main portion, said filiform elements being formed of elastic non-metallic material having a modulus of elasticity below 2000 kilograms per sq. mm., said filiform elements being oriented at an angle between approximately 0° and 15° with the equatorial plane of the tire.

16. A pneumatic tire as claimed in claim 14 wherein the filiform elements of the folded over ply form an angle between 12° and 45° with the equatorial plane of the tire.

17. A pneumatic tire as claimed in claim 16 wherein the filiform elements of the folded over ply form an angle of between 20° and 30° with the equatorial plane of the tire.

18. A pneumatic tire as claimed in claim 15 wherein the filiform elements of the folded over ply form an angle between 12° and 45° with the equatorial plane of the tire.

19. A pneumatic tire as claimed in claim 18 wherein the filiform elements of the folded over ply form an angle of between 20° and 30° with the equatorial plane of the tire.

20. A pneumatic tire as claimed in claim 1 wherein the width of said auxiliary portion is between 65% and 90% of the width of said main portion.

21. A pneumatic tire as claimed in claim 7 wherein said supplementary ply has a width of between 10% and 110% of the width of the main portion.

22. A pneumatic tire as claimed in claim 1 wherein said tread includes sculptures with hollow spacing therebetween, said tread having a ratio of sculptured area to hollowed area that increases in a lateral direction from the axially internal edge to the axially external edge of said tread.

23. A pneumatic tire as claimed in claim 7 wherein said tread includes sculptures with hollow spacing therebetween, said tread having a ratio of sculptured area to hollow area that increases in a lateral direction from the axially internal edge to the axially external edge of said tread.

* * * * *